United States Patent

[11] 3,630,021

| [72] | Inventor | Irving N. Bishop |
| | | 32046 Bonnet Hill, Farmington, Mich. 48024 |
| [21] | Appl. No. | 42,643 |
| [22] | Filed | June 2, 1970 |
| [45] | Patented | Dec. 28, 1971 |

[54] INTERNAL COMBUSTION ENGINE INCLUDING MEANS FOR REDUCING EMISSIONS
11 Claims, 7 Drawing Figs.

| [52] | U.S. Cl. | 60/30 R |
| [51] | Int. Cl. | F01n 3/10 |
| [50] | Field of Search | 60/30; 123/26 |

[56] References Cited
UNITED STATES PATENTS

| 2,991,767 | 7/1961 | Candelise | 123/26 |
| 3,537,257 | 11/1970 | Webster | 60/30 |

*Primary Examiner*—Douglas Hart
*Attorneys*—John R. Faulkner and Keith L. Zerschling

ABSTRACT: An internal combustion engine having a combustion cylinder with a piston reciprocably mounted therein and a head positioned over the combustion chamber. The cylinder head has an exhaust passage positioned therein communicating with the combustion chamber and an exhaust valve positioned in the exhaust passage. Means are provided in the cylinder head and communicating with the exhaust passage and the combustion chamber for injecting air under pressure into the exhaust passage and into the combustion chamber during the expansion of the piston after the exhaust valve is opened and during the exhaust stroke. This means includes means for either continuously injecting air under pressure into the exhaust passage or for sequentially injecting air first into the exhaust passage and then into the combustion chamber subsequent to the opening of the exhaust valve.

PATENTED DEC 28 1971 3,630,021

INVENTOR
IRVING N. BISHOP

BY John R. Faulkner
Keith L. Zerschling
ATTORNEYS

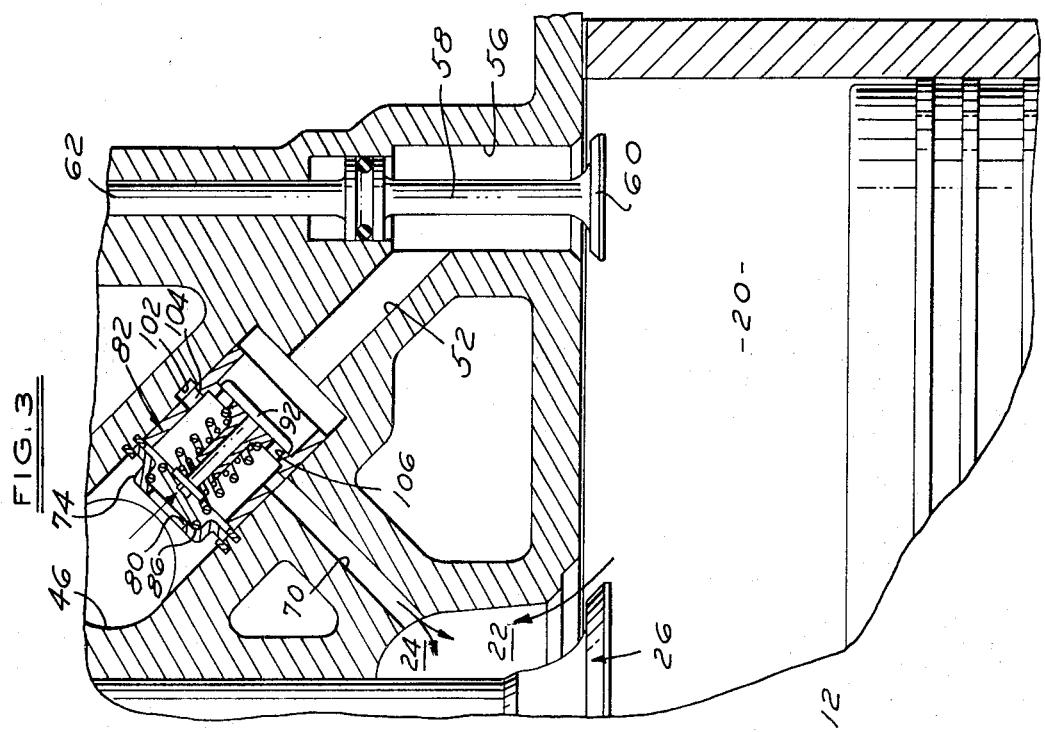
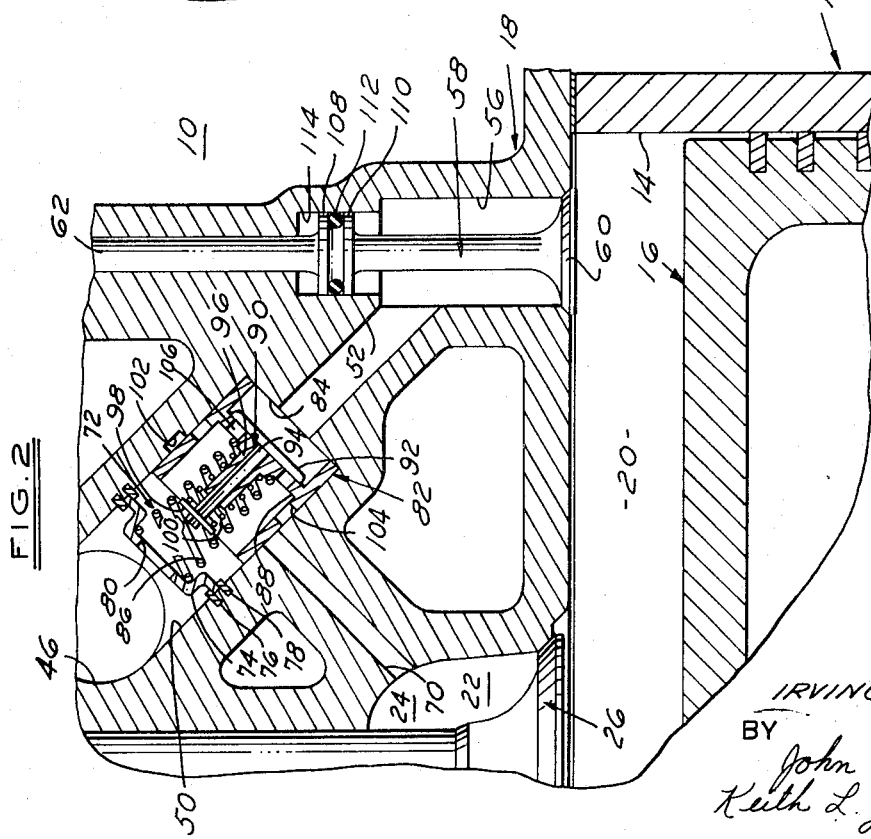

INVENTOR
IRVING N. BISHOP
BY John R. Faulkner
Keith L. Zerschling
ATTORNEYS

3,630,021

INTERNAL COMBUSTION ENGINE INCLUDING MEANS FOR REDUCING EMISSIONS

BACKGROUND OF THE INVENTION

This invention relates to internal combustion engines and, more particularly, to internal combustion engines with means included therein for reducing the emission levels of unburned hydrocarbons and carbon monoxide.

An analysis of the combustion processes in the combustion chamber of an internal combustion engine suggests that the mechanism of unburned hydrocarbon emission creation and destruction is as follows. As the flame in the combustion chamber approaches the wall of the cylinder, it is quenched by the cold walls leaving an unburned layer of gas at the wall. The thickness of this layer varies inversely with the wall temperatures and the gas pressure. It is believed that, in an internal combustion engine, this layer is left undisturbed during the downstroke of the piston travel until such time as the exhaust valve opens and the gas is allowed to flow from the cylinder during the period of upward piston travel. This outward flow of gas causes the quenched gases to be scrubbed from the walls and to mix with the hot combustion products and to be burned. The degree of this burning depends upon the bulk gas temperature, time and quantities of oxygen and carbon monoxide present.

If air is injected into the cylinder or combustion chamber during the exhaust period so as to increase the oxygen concentration in the bulk gas, rapid oxidation of unburned hydrocarbon and carbon monoxide will ensue within the combustion chamber. This would clearly increase gas temperatures in the exhaust system which would also increase the effectiveness of the normal postoxidation processes known to normally occur in this area.

It is also well known that carbon monoxide concentrations depend on the overall ratio of air to fuel and that the postoxidation process is quite slow at feasible exhaust system temperature levels. Inasmuch as the temperature existing in the combustion chamber are very much higher than those existing in the exhaust system, it is clear that the oxidation of carbon monoxide to carbon dioxide will be very much more effective in the combustion chamber than in the exhaust system.

Certain prior art publications suggest the possibility of reducing the carbon monoxide and unburned hydrocarbon concentrations in an internal combustion engine by injecting air into the combustion chamber during the exhaust stroke of the piston. See, for example, U.S. Pat. Nos. 3,017,872; 3,043,281; 3,043,289 and 3,195,518. The present invention utilizes unique and novel means for injecting air into the combustion chamber of an internal combustion engine at a time subsequent to the opening of the exhaust valve and simultaneously or sequentially injecting air into the exhaust port or passage leading from the combustion chamber. As a result, the present invention provides a means in an internal combustion engine that is feasible and that operates at maximum efficiency to reduce the unburned hydrocarbon and carbon monoxide concentrations emitted from an internal combustion engine.

SUMMARY OF THE INVENTION

In the present invention, an internal combustion engine is provided with means for injecting air under pressure into a combustion chamber during the expansion stroke subsequent to the opening of the exhaust valve and during the exhaust stroke. Means are also employed to inject air under pressure into the exhaust port or passage communicating with the combustion chamber either on a continuous basis or sequentially just prior to the time that air is injected into the combustion chamber during the expansion stroke.

A source of air under pressure is provided for the internal combustion engine which may take the form of a compressor driven from the crankshaft of the engine. Means are provided in the form of an air passage in the cylinder head to provide this air under pressure to each of the combustion chambers. Each of the combustion chambers is provided with an air induction or admittance valve positioned in the cylinder head and a passageway connects the source of air under pressure in the air passage with the port of this air induction or admittance valve. A check valve is positioned in this passage and an air passage connects this check valve with the exhaust port or passage leading from the exhaust valve.

In the preferred form of the invention, the air induction or admittance valve is operated by the same means that operates and opens the exhaust valve; for example, the air admittance or induction valve may be coupled to the rocker arm that operates the exhaust valve so that it will open simultaneously with or a short time prior to the opening of the exhaust valve. The check valve means prevents the products of combustion in the combustion chamber from flowing into the source of air under pressure when the pressure of the products of combustion is higher than the pressure of the source of air. As the piston travels further down the cylinder during the expansion cycle, the pressure in the combustion chamber falls below the pressure of the source of air under pressure and air under pressure is injected through the open induction or admittance valve into the combustion chamber thereby oxidizing the unburned hydrocarbons and carbon monoxide present in the products of combustion in the combustion chamber.

In one embodiment of the invention, the check valve means includes means for connecting the exhaust port or passage to the source of air under pressure immediately subsequent to the opening of the exhaust valve and the air admittance valve and at a time when the pressure of the products of combustion in the combustion chamber is greater than the pressure of the source of air under pressure. When the pressure of the products of combustion in the combustion chamber falls below the pressure of the source of air, the check valve means terminates the injection of air into the exhaust port or passage and then permits air to be injected into the combustion chamber through the open air induction or admittance valve.

In another form of the invention, the check valve means includes means for continuously injecting air under pressure into the exhaust port or passage and for injecting air into the combustion chamber subsequent to the opening of the exhaust valve and the air admittance valve and subsequent to the pressure of the products of combustion falling below the pressure of the source of air under pressure.

Thus, in both embodiments of the invention, not only is air under pressure injected into the combustion chamber during the exhaust stroke and the expansion stroke immediately after the opening of the exhaust valve, but air under pressure is injected into the exhaust port or exhaust passage to oxidize the unburned hydrocarbons and the carbon monoxide present in the exhaust passage.

Thus, the present invention provides a new and novel means for oxidizing the unburned hydrocarbons and the carbon monoxide present in a combustion chamber of an internal combustion engine and also for oxidizing the products of combustion as they are expelled from the combustion chamber into the exhaust port and passage of the internal combustion engine.

BRIEF DESCRIPTION OF THE DRAWINGS

FIG. 2 is a partial sectional view of the structure shown in FIG. 1 showing the various parts of the present invention in the position they occupy during the intake, compression and combustion strokes and during the expansion stroke of the piston up to the time of exhaust valve opening;

FIG. 3 is a view similar to FIG. 2 and showing the parts in the position they occupy during the expansion stroke at a time subsequent to the opening of the exhaust valve and with the pressure in the combustion chamber higher than the pressure in the air manifold of the present invention;

DESCRIPTION OF THE PREFERRED EMBODIMENTS

Figure 1:
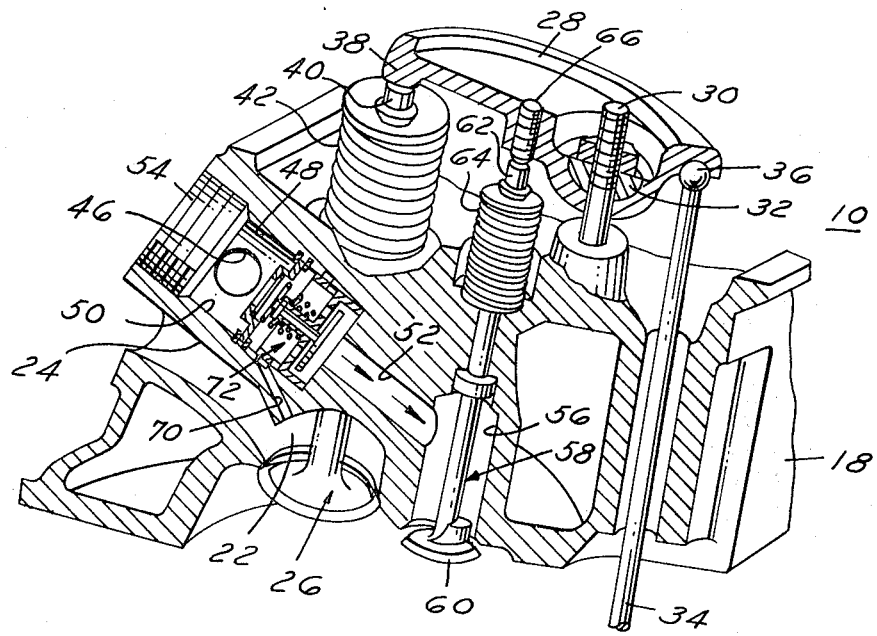
FIG. 1 is a sectional view, partially in elevation, through a cylinder head of an internal combustion engine employing the present invention.

Referring now to the drawings in which like reference numerals designate like parts throughout the various views thereof, there is shown, in FIGS. 1 and 2, partial sectional views through an internal combustion engine 10 employing the present invention. The internal combustion engine 10 includes a cylinder block 12 having a bore or cylinder 14 positioned therein which receives a piston 16. A cylinder head 18 is mounted over the cylinder block 12 and forms, together with the piston 16 and the cylinder 14, a combustion chamber 20.

The cylinder head 18 has an exhaust port 22 positioned therein which communicates with the combustion chamber 20 and with an exhaust passage 24. An exhaust valve 26 is reciprocably mounted in a bore in the cylinder head 18 and is operated by means of a rocker arm 28 suitably mounted on the cylinder head 18 by means of a stud 30 and a spherical-type bearing 32, as is conventional in internal combustion engines. A push rod 34, operated in synchronism with the internal combustion engine and the piston 16, engages one end of the rocker arm 28 at the location designated by the numeral 36. The other end 38 of the rocker arm 28 is positioned for engagement with the end of the valve stem 40 of the exhaust valve 26. An exhaust valve spring 42 is positioned in engagement at one end with the cylinder head 18 and at the other end with the valve stem 40 by conventional fastening means to bias the exhaust valve 26 closed so that it closes the exhaust port 22.

While not shown in the drawings, it is to be understood that each combustion chamber 20 is provided with an induction valve and a valve gear train including a rocker arm and push rod for operating the induction valve. It is also to be understood that each of the cylinders and combustion chambers 20 of the internal combustion engine utilizing the present invention is identical and employs the same parts and mechanisms.

The cylinder head 18 is provided with a longitudinally extending air passage, manifold or gallery 46 that contains a supply of air under pressure. This air under pressure may be supplied to the passage or gallery 46 by means of a belt-driven air compressor (not shown) that is driven from the crankshaft of the engine. An air compressor of this type that may be used is shown in Ford Motor Company 1968 Cougar, Fairlane, Falcon, Montego, Mustang Shop Manual on Page 8-34. An inwardly extending air passage in the form of bore 48 is positioned in the cylinder head 18 at the location of each combustion chamber 20 and piston 16. This bore 48 has a first larger portion 50 and a second reduced portion 52. The larger portion 50 communicates with the air passage or gallery 46 and has the end thereof blocked off by means of a threaded plug 54. The second reduced portion 52 of smaller diameter communicates with an induction port or chamber 56 having an air induction or admittance valve 58 located therein. This air induction valve 58 includes a head 60 adapted to close the induction port or chamber 56 and a stem 62 reciprocably mounted in a bore in the cylinder head 18.

The air induction valve 58 is biased to its closed position by a spring 64 which has one end engaging the cylinder head 18 and the other end suitably connected to the stem 62 by means similar to that employed to connect the exhaust valve spring 42 to the stem 40 of exhaust valve 26. The rocker arm 28 has an actuating stud 66 positioned intermediate the stud and spherical bearing mechanism 30 and 32, respectively, and the end 38 thereof that engages the exhaust valve stem 40.

The cylinder head 18 also has an air passage 70 positioned therein that provides communication between the enlarged portion 50 of the bore 48 and the exhaust port and passage 22 and 24, respectively.

A dual purpose check valve arrangement 72 is positioned in the enlarged portion 50 of the bore 48 and, as can be readily seen from an inspection of FIG. 2, this dual purpose check valve arrangement 72 is comprised of an annular, stationary support member 74 that may be suitably affixed in the enlarged portion 50 of the bore 48 by means of a pair of C-type clips 76 and 78. This support member 74 has a central aperture 80 positioned therein so that air under pressure present in the air passage or gallery 46 may pass through the support member 74.

The dual purpose check valve arrangement 72 also includes an annular sleeve 82 slidably mounted in the enlarged portion 50 of the bore 48. This annular sleeve 82 is biased into the position shown in FIG. 2, where the end thereof opposite the stationary support 74 engages the end 84 of the enlarged portion 50 of the bore 48, by means of a helical compression spring 86. The sleeve 82 includes a radially inwardly extending valve seat 88, and a valve member 90 having a head portion 92 and a valve stem 94 is mounted for reciprocating axial movement within the slidable sleeve 82 by means of an axially extending support 96 that slidably receives the valve stem 94. The valve stem 94 has an annular radially extending washer 98 positioned thereon at the end opposite the head 92 and a helical compression spring 100 engages the washer 98 and the support 96 for biasing the head 92 of the valve 90 into engagement with the valve seat 88 formed on the slidable sleeve 82.

The dual purpose check valve arrangement 72 also includes an annular groove 102 positioned in the enlarged portion 50 of the bore 48. This annular groove 102 communicates with the air passage 70 which is in communication at its other end with the exhaust port and passage 22 and 24, respectively. The annular sleeve 82 has a plurality of circumferentially extending slots, two of which are shown at 104, which are complementary to the annular groove 102 and are adapted to communicate therewith. In addition, the radially inwardly extending valve seat 88 has a plurality of apertures 106 located therein.

As can best be seen by reference to FIG. 2, the air admittance or induction valve 58 includes a pair of radially outwardly extending flanges 108 and 110 having an O-ring seal 112 positioned therebetween, The flanges 108 and 110 and the O-ring seal 112 operate in a bore 114, and the sealing arrangement comprised of the two flanges 108 and 110 and the O-ring seal 112 are provided to prevent the air injected into the combustion chamber 20 through the air admittance or induction valve 58 from being contaminated by engine oil that is present in the location of the valve stem 62.

Figure 5:
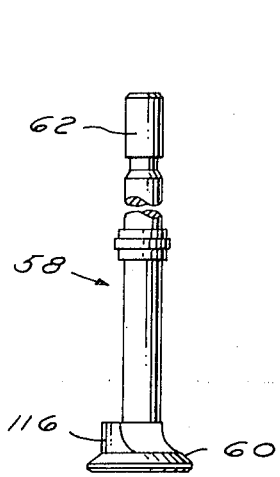
FIG. 5 is an elevational view of an alternate form of the air induction or admittance valve employed with the present invention.
Figure 6:
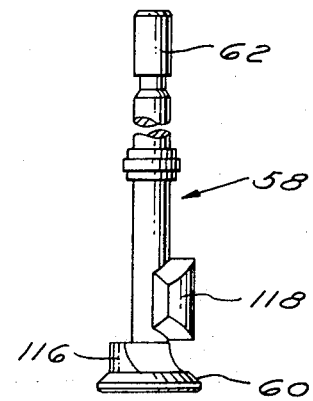
FIG. 6 is an elevational view of another alternate form of the air induction or admittance valve employed with the present invention.

In addition to the air admittance or induction valve 58, as shown in FIG. 2, alternate types, as shown in FIGS. 5 and 6, may be employed. The valve shown in FIG. 5 has a shroud 116 located immediately above the head 60 and this shroud 116 is located, as shown in FIG. 1, to direct the air admitted by the air induction or admittance valve 58 into the central portion of the combustion chamber 20 or in a direction toward the exhaust valve 26. In addition, this air admittance or induction valve 58 may have a deflector 118 positioned above the shroud 116 to further aid in the direction and deflection of the air admitted into the combustion chamber 20 by the valve 58 towards the center portion of the combustion chamber 20 and toward the exhaust valve 26.

Figure 7:
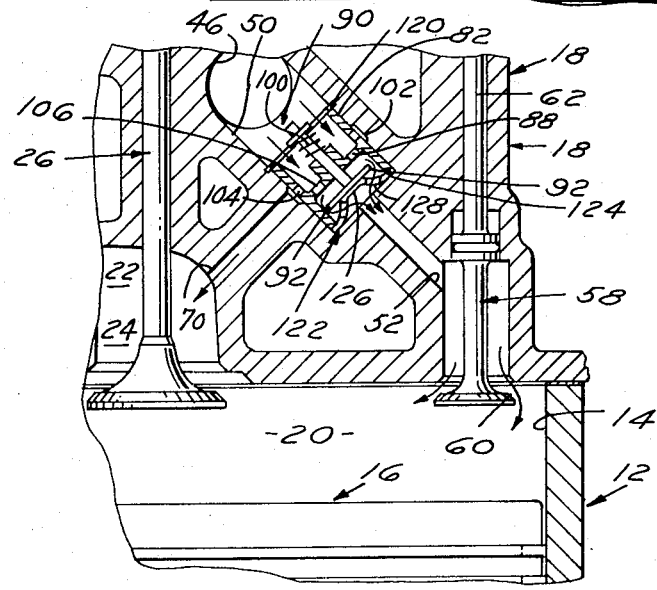
FIG. 7 is a partial sectional view of an alternate embodiment of the present invention.

As will be more fully explained subsequently, the dual purpose check valve arrangement 72, shown in FIGS. 1 through 4, injects air sequentially into the exhaust port and passage 22 and 24 and then into the combustion chamber 20 through the air admittance or induction valve 58 at a time subsequent to the opening of the exhaust valve 26. In FIG. 7, there is shown another embodiment of the invention in which air is injected continuously into the exhaust port and passage 22 and 24 and is injected into the combustion chamber 20 subsequent to the opening of the exhaust valve 26 and the opening of the air induction or admittance valve 58. To accomplish this purpose, the dual purpose check valve arrangement 72 is modified, as shown in FIG. 7, so that the annular sleeve 82 is stationary in the enlarged portion 50 of the bore 48 in a position where the circumferentially extending slots 104 positioned therein are in permanent communication with the annular groove 102 and hence, with the air passage 70 that communicates with the exhaust port and passage 22 and 24. The sleeve 82 is positioned at one end against a retainer 120 and at the other end against a support structure 122 that has a circumferentially extending flange 124 positioned against the end wall 84 of the enlarged portion 50 of the bore 48. This support structure 122 also has a radially extending platform 126 that limits the movement of the valve 90 by engaging the head 92 of this valve and a plurality of apertures 128 located therein to permit the passage of air.

OPERATION

In the embodiment of the invention shown in FIGS. 1 through 4, the exhaust valve 26 and the air admittance or induction valve 58 will be in the closed position, as shown in FIG. 2, during the intake, compression and combustion strokes and a portion of the expansion stroke of the internal combustion engine.

During this period of engine operation, the various parts of the check valve arrangement 72 will be in the position shown in FIG. 2. The compression spring 86 will force the sleeve 82 into engagement with the end 84 of the enlarged portion 50 of the bore 48 so that the slots 104 positioned in sleeve 82 are out of engagement with the annular groove 102 and hence, the air passage 70. In addition, the compression spring 100 will force the head 92 of valve 90 into engagement with the valve seat 88 thereby closing openings or apertures 106 located therein. As a result, air under pressure in the air passage or gallery 46 cannot flow into the exhaust port 22 and passage 24 via the air passage 70, nor can it flow into the reduced portion 52 of the bore 48 and the port or chamber 56 of air induction or admittance valve 58.

The exhaust valve 26 and the air induction or admittance valve 58 will be opened during the expansion stroke when the piston 16 is approximately two-thirds of the way from top dead center to bottom dead center. At this time, the push rod 34 will move upwardly, as shown in FIG. 1, under the impetus of the lobes on the camshaft (not shown) thereby moving the end 38 of the rocker arm 28 and the actuating stud 66 downwardly. This action opens the exhaust valve 26 against the force of the valve spring 42 and opens the air or admittance valve 58 against the force of the spring 64.

At this time, the pressure of the heated gases of combustion present in the combustion chamber 20 will be greater than the pressure of the source of air under pressure contained in the air passage or gallery 46. As a result of this pressure differential, the sleeve 82 will be shifted upwardly and to the left into the position shown in FIG. 3 by virtue of the force acting on the valve head 92 against the bias of the compression spring 86. Consequently, the circumferential grooves 104 in the annular sleeve 82 will come into communication with the annular groove 102 positioned in the enlarged portion 50 of the air passage or bore 48. As a result, air under pressure from the air passage 46 will be injected into the exhaust port 22 and exhaust passage 24 through the central aperture 80 in the stationary support 74, the circumferential slots 104 in the annular sleeve 82, the circumferential groove 102 and the air passage 70. At this time, the head 92 of the valve 90 will be in engagement with the valve seat 88 thereby covering the apertures 106 located therein because the pressure of the products of combustion in combustion chamber 20 is greater than the pressure of the air in air passage or gallery 46. As a result, no air can flow through the reduced portion 52 of the air passage 48 and into the combustion chamber 20 via chamber 56 and the open air induction or admittance valve 58.

As the piston 16 moves toward bottom dead center, the pressure of the products of combustion in the combustion chamber 20 will be reduced, and at a time prior to the piston 16 reaching bottom dead center, the pressure of the air contained in the air passage 46 will exceed the pressure of the products of combustion in the combustion chamber 20. The sleeve 82 will be shifted downwardly at this time into the position shown in FIG. 4 as a result of this pressure differential. This action will bring the circumferential slots 104, positioned in the annular sleeve 82, out of communication with the annular groove 102 positioned in the enlarged portion 50 of the air passage or bore 48. Consequently, air can no longer be injected through the air passage 70 into the exhaust port 22 and exhaust passage 24.

Figure 4:
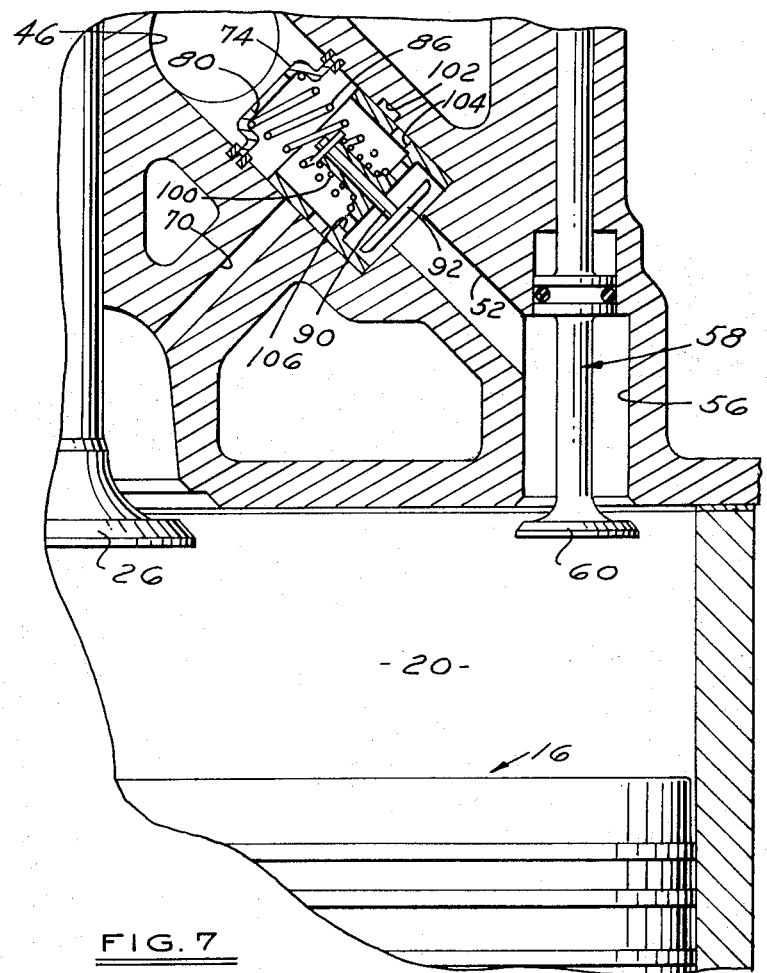
FIG. 4 is a view similar to FIG. 3 and showing the parts of the present invention in the position they occupy at a time subsequent to the opening of the exhaust valve and when the pressure in the air manifold is higher than the pressure in the combustion chamber.

As the pressure of the products of combustion present in the combustion chamber 20 continues to decrease, the pressure differential existing between the pressure of the air present in the air passage or gallery 46 and the pressure in the combustion chamber 20 will act on the head 92 of the valve 90 through the apertures 106 in the valve seat 88 and will move the valve 90 to the open position, shown in FIG. 4, against the force of the compression spring 100. As a result, air will be injected into the combustion chamber 20 from the air passage or gallery 46 through the central aperture 80 in the stationary support 74, the apertures 106 in the valve seat 88, the reduced portion 52 of the drilled air passage or bore 48, chamber or port 56 and the open air induction or admittance valve 58.

The exhaust valve 26 and the air induction or admittance valve 58 remain in the open position, as shown in FIG. 4, during the exhaust stroke or cycle of the internal combustion engine. When the exhaust valve 26 and the air admittance or induction valve 58 close under the action of the valve spring 42 and compression spring 64, respectively, as the push rod 34 moves downwardly, as shown in FIG. 1, the air pressure on the head 92 of the valve 90 will be balanced and the valve 90 will close under the bias of the compression spring 100 thereby returning the mechanism to the position shown in FIG. 2.

The operation of the embodiment of the invention shown in FIG. 7 is similar to the operation described above with respect to the embodiment shown in FIGS. 1 through 4. In this instance, however, the annular sleeve 82 is stationary so that air under pressure is continuously injected into the exhaust port 22 and exhaust passage 24 from the source of air under pressure contained in the air passage or gallery 46 through the circumferential slots 104 in the sleeve 82, the annular groove 102 in the enlarged portion 50 of the air passage or bore 48 and the passage 70.

During the intake, compression and combustion strokes and during the expansion stroke of the piston 16 until the time when the exhaust valve 26 is opened, the air admittance or induction valve 58 is closed and the valve head 92 on the valve 90 will be in engagement with the valve seat 88 thereby closing the apertures 106 in the valve seat 88. This condition will also prevail after the exhaust valve 26 and the air admittance or induction valve 58 open until the time that the pressure of the products of combustion in the combustion chamber 20 is lower than the pressure of the air contained in the air passage or gallery 46. When this occurs, the pressure differential across the valve head 92 of the valve 90 will open the valve 90 and move it into the position shown in FIG. 7 against the force of the compression spring 100. Air under pressure will then be injected into the combustion chamber 20 from the source of air under pressure contained in the air passage or gallery 46 through the apertures 106 positioned in the valve seat 88, the apertures 128 positioned in the support member 122, the reduced portion 52 of the air passage 48, chamber or port 56 and the open air admittance or induction valve 58.

As stated previously, the air admittance or induction valve 58 may be provided with a shroud 116 positioned just above the head 60 to direct the air injected into the combustion chamber 20 towards the center of the combustion chamber and towards the exhaust valve 26, as shown in FIG. 1. Additionally, the valve 58 may be provided with a deflector 118 which will aid in directing the air toward these positions.

The injection of air into the combustion chamber 20 during a portion of the expansion stroke and during the exhaust stroke of the piston 16 increases the oxygen concentration in the gas contained in the combustion chamber at this time. This results in rapid oxidation of the unburned hydrocarbons and the carbon monoxide present within the combustion chamber thereby reducing the emission levels of unburned hydrocarbons and carbon monoxide from the internal combustion engine. Additionally, oxidizing air under pressure is fed into the exhaust port and exhaust passage for oxidizing the unburned hydrocarbons and carbon monoxide either continuously or during that portion of the combustion and expansion cycle in which it is impractical or impossible to inject air directly into the combustion chamber, that is, at times when the pressure of the products of combustion is very high. The check valve arrangement serves the purpose of blocking or preventing the flow of exhaust gas backward into the air supply system of the present invention during the exhaust blowdown period when the pressure of the products of combustion in the combustion chamber is higher than the pressure of the source of air contained in the air passage or gallery.

I claim:

1. In an internal combustion engine having a combustion chamber, a piston reciprocably positioned therein, a cylinder head positioned over one end of said combustion chamber, said cylinder head having an exhaust passage positioned therein adapted to communicate with said combustion chamber, an exhaust valve seated in said exhaust passage, means mounted on said engine and operated in synchronism therewith for periodically opening said exhaust valve, a source of air under pressure, said cylinder head having an air passage positioned therein coupled to said source of air under pressure and adapted to communicate with said combustion chamber, an induction valve seated in said air passage, said means including means coupled to said induction valve for periodically opening said induction valve in synchronism with the opening of said exhaust valve and check valve means positioned in said air passage for causing communication of said air under pressure with said combustion chamber when said induction valve is open and the pressure of said air under pressure exceeds the pressure existing in said combustion chamber and for preventing such communication when said induction valve is open and the pressure in said combustion chamber exceeds the pressure of said air.

2. The combination of claim 1 in which said cylinder head includes a passageway connecting said exhaust passage with said air passage at the location of said check valve means, said check valve means including means for permitting air under pressure to flow through said passageway into said exhaust passage.

3. The combination of claim 2 in which said last mentioned means includes means for permitting air under pressure to flow through said passageway into said exhaust passage when said induction valve is open and the pressure in said combustion chamber exceeds the pressure of said air and for preventing such flow when said induction valve is open and the pressure of said air exceeds the pressure in said combustion chamber.

4. In an internal combustion engine having a combustion chamber, a piston reciprocably mounted in said combustion chamber, a head positioned over the end of said combustion chamber, said cylinder head having an exhaust passage positioned therein communicating with said combustion chamber, an exhaust valve positioned in said exhaust passage, and means positioned in said cylinder head and communication with said exhaust passage and said combustion chamber for sequentially injecting air under pressure into said exhaust passage and said combustion chamber after said exhaust valve is opened, said means comprising an air induction valve reciprocably mounted in said cylinder head and communicating with said combustion chamber, a source of air under pressure, said cylinder head having an air gallery positioned therein coupled to said source of air under pressure, a first air passage connecting said air manifold and said induction valve, and a second air passage connecting said first air passage and said exhaust passage, a valve means positioned in said first air passage at the junction of said first and second air passages for permitting air flow from said air gallery to said exhaust passage and blocking air flow through said air induction valve into said combustion chamber when said exhaust valve and said air induction valve are open and the pressure in said combustion chamber is higher than in said air gallery and blocking air flow from said air gallery to said exhaust passage and permitting air flow through said induction valve into said combustion chamber when said exhaust valve and said air induction valve are open and the pressure in said combustion chamber is lower than in said air gallery.

5. The combination of claim 4 further comprising means coupled to said exhaust valve and said air induction valve and operated in synchronism with the internal combustion engine for simultaneously opening said air induction valve and said exhaust valve.

6. The combination of claim 5 in which said means comprises an exhaust valve rocker arm mounted on said cylinder head.

7. In an internal combustion engine comprising a cylinder, a cylinder head covering said cylinder and a piston reciprocably mounted in said cylinder thereby defining a combustion chamber, the reciprocating of said piston creating intake, compression, combustion, expansion and exhaust cycles in said combustion chamber, an exhaust passage communicating with said combustion chamber and means for injecting air under pressure into said combustion chamber during said exhaust cycle and a portion of said expansion cycle, said exhaust passage terminating at said combustion chamber in an exhaust port, an exhaust valve reciprocably mounted in said exhaust port, means coupled to said exhaust valve and operated in synchronism with said piston, said means for injecting air under pressure including a source of air under pressure, an air passage connected to said source of air under pressure and terminating at said combustion chamber in an induction port, and an induction valve positioned in said induction port, and means coupling said induction valve and said means coupled to said exhaust valve for opening said induction valve when said exhaust valve opens.

8. The combination of claim 7 further comprising a check valve means positioned in said air passage for blocking said passage when said induction valve is open and the pressure of said source of air under pressure and for opening said air passage when said induction valve is open and the pressure in said combustion chamber is lower than the pressure of said source of air under pressure.

9. The combination of claim 8 in which said means for injecting air under pressure includes a passage communicating with said air passage and said exhaust passage.

10. The combination of claim 9 in which said last-mentioned passage communicates with said air passage at a position intermediate said source of air under pressure and said check valve means.

11. The combination of claim 9 in which said last-mentioned passage communicates with said induction passage at a position intermediate said check valve means and said induction valve.

* * * * *